J. E. Austin,
Sawing Shingles.
N° 82,067. Patented Sep. 15, 1868.

Witnesses
Wm J Dodge
Beverly Chase

Inventor
James E. Austin
per H. A. Morley &c
Atty

UNITED STATES PATENT OFFICE.

JAMES E. AUSTIN, OF OSWEGO, NEW YORK.

IMPROVEMENT IN SHINGLE-MACHINES.

Specification forming part of Letters Patent No. 82,067, dated September 15, 1868.

*To all whom it may concern:*

Be it known that I, JAMES E. AUSTIN, of Oswego, in the county of Oswego and State of New York, have invented a new and useful Improvement in Shingle-Machines; and I do hereby declare that the following is a full, clear, and exact description thereof, which will enable those skilled in the art to make and use the same, reference being had to the accompanying drawings, forming part of this specification, in which—

Figure 1:
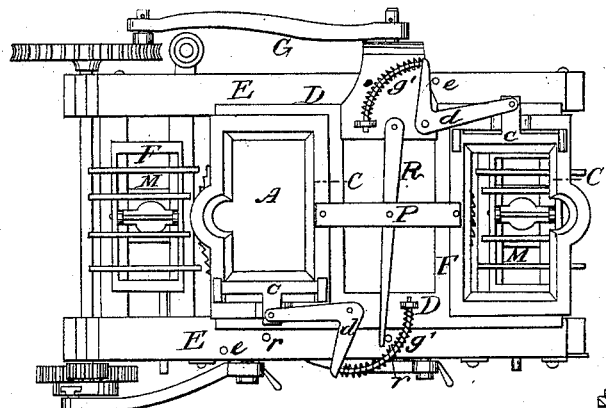
Figure 2:
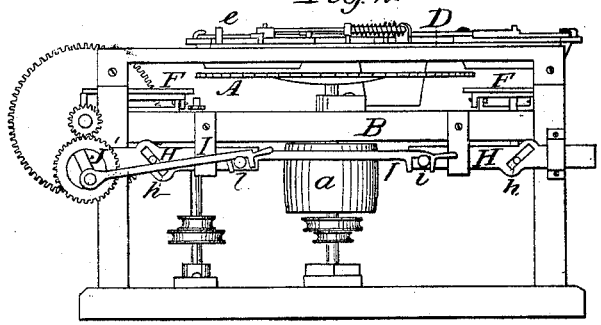
Figure 3:
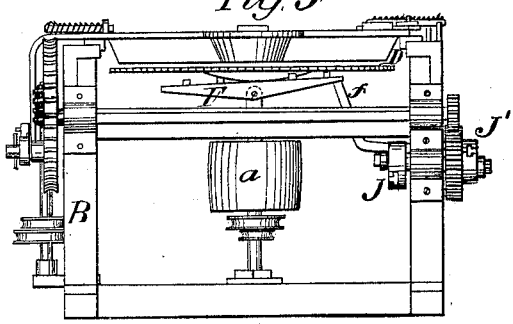
Figure 4:
Figure 5:
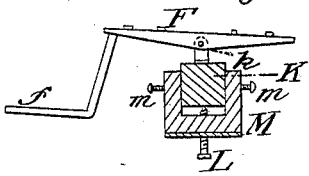
Figure 6:
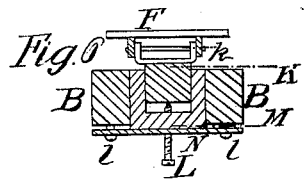

Figure 1 is a plan view of my invention. Fig. 2 is a side view, and Fig. 3 is an end view. Figs. 4, 5, and 6 are detail views.

Similar letters of reference indicate like parts in all the figures.

In the accompanying drawings, A is a large circular saw, which is mounted on a vertical shaft supported in frame B, and is driven by a pulley, $a$. On opposite sides of the saw are two bolt-holders or boxes, C C, Fig. 1, for holding the shingle-bolts while they are being carried to and from the saw. These bolt-holders C C are mounted in a sliding bed-plate or frame, D, which slides horizontally on the guides E E, and is driven back and forth by the pitman G. The bolt-holders have each a dog, $c$, for securing its shingle-bolt. These dogs are operated by elbow-levers $d$, which are pivoted to frame D, and provided with spiral springs $g$ in such manner that as a bolt-holder is carried from the saw by motion of plate D its elbow-lever $d$ comes in contact with a pin or tappet, $r$, and this throws the elbow-lever back, so that the dog $c$ is withdrawn and the shingle-bolt allowed to drop onto its gaging and tilting table; but as soon as the motion of the plate D is changed, then elbow-lever $d$ leaves the tappet-pin $e$, and the spiral spring $g$ then actuates the elbow-lever to throw the dog $c$ into the shingle-bolt until another backward stroke is made. The tilting and gaging tables F are tilted each by means of an arm, $f$, which projects from one end of the table, as shown in Fig. 5, and engages with an oblique slot, $h$, in one of the slides H, Fig. 2.

The slides H H are operated by rods I I, which receive motion from the slotted crank-wheels J J', Figs. 2 and 3. The crank-pins can be adjusted in the slots of wheels J J', so that the rods I I shall have more or less throw, and by this means the degree of tilting motion for tables F is readily regulated to give a greater or less degree of taper to the shingle. When one end of the shingle-bolt is much thicker than its other end, then several butts of shingles are taken successively from the thick end of the shingle-bolt, and to do this the operator at the proper time disengages the hook $i$ of rod I, Fig. 2, from its slide H until several shingles have been taken from the bolt while the tilting table F remained in one position, and the shingle-bolt has been cut so as to be even, when he drops the hook $i$ into action again.

The tilting table F is pivoted to a fulcrum-block, K, Figs. 5 and 6, by a pivot, $k$. The fulcrum-block K is held in a socket in a second block, M, and is vertically adjustable in said socket for regulating the thickness of cut by means of a set-screw, L. The lower block is secured to the frame-work B, Fig. 6, by a slotted plate, N, and set-screws $l$, passing through the said slots in such manner that by adjusting the plate N laterally on the frame-work B, the fulcrum of the tilting tables F are adjusted laterally with relation to the whole machine, and the tilting axes are readily brought under the centers of the bolt-holders correctly. The fulcrum-block K is also fitted into the socket of block M, so as to have a twisting adjustment, and is secured in position by set-screws $m$ $m$, Fig. 5. I raise the bolt-holders on their return-stroke, so that the shingle-bolt will clear the saw, as follows: The bolt-holders C C are held in the sliding frame or bed-plate D in such manner as to have a little play therein, and are then linked together by a rigid bar, P, Fig. 1. A lever, R, is then pivoted to the frame D at one end, and its center to the link P, as shown. As the sliding plate D moves back and forth the free end of lever R strikes the tappets $r$ $r$ at each end of the stroke, and this moves the bolt-holders with relation to frame D, so that small wedges $s$ $s$, Fig. 4, on the flanges of C are forced over inclined surfaces on frame D, and by this means the bolts are slightly elevated at each return-stroke from the saw.

For sawing out barrel-heading stuff instead of shingles, the tables F are set for the proper thickness of cut, and the tables are then disengaged from their tilting devices and are fixed in position, so that the cut has no taper, as in shingles.

Having thus described my invention, what I claim as new, and desire to secure by Letters Patent, is—

1. The method of operating the tilting tables F F—namely, the projecting arms $f$, obliquely-slotted-slide bars H $h$, the hooking connecting-rods I $i$, and crank-wheels J, having adjustable wrists or crank-pins, all arranged and operating as herein shown and described, and for the purpose set forth.

2. In connection with the tables F, the laterally-adjustable plate and socket-block N $l$ $l$ M, and vertically-adjustable fulcrum-block K L, constructed and operating as herein shown, and for the purpose described.

3. The bolt-holders C C, having a horizontal movement on frame D, and provided with wedges $s$ $s$, for acting on inclined surfaces of said frame D in such manner that all sides of the bolt-holders are lifted alike, in connection with tappet-lever R and link P, or other suitable device for obtaining the sliding movement of bolt-holders on frame D, as and for the purpose described.

The above specification of my invention signed by me this 17th day of June, 1868.

JAMES E. AUSTIN.

Witnesses:
 WM. J. DODGE,
 F. A. MORLEY.